(No Model.) 2 Sheets—Sheet 1.
M. MACLEOD.
AGRICULTURAL IMPLEMENT.
No. 479,094. Patented July 19, 1892.
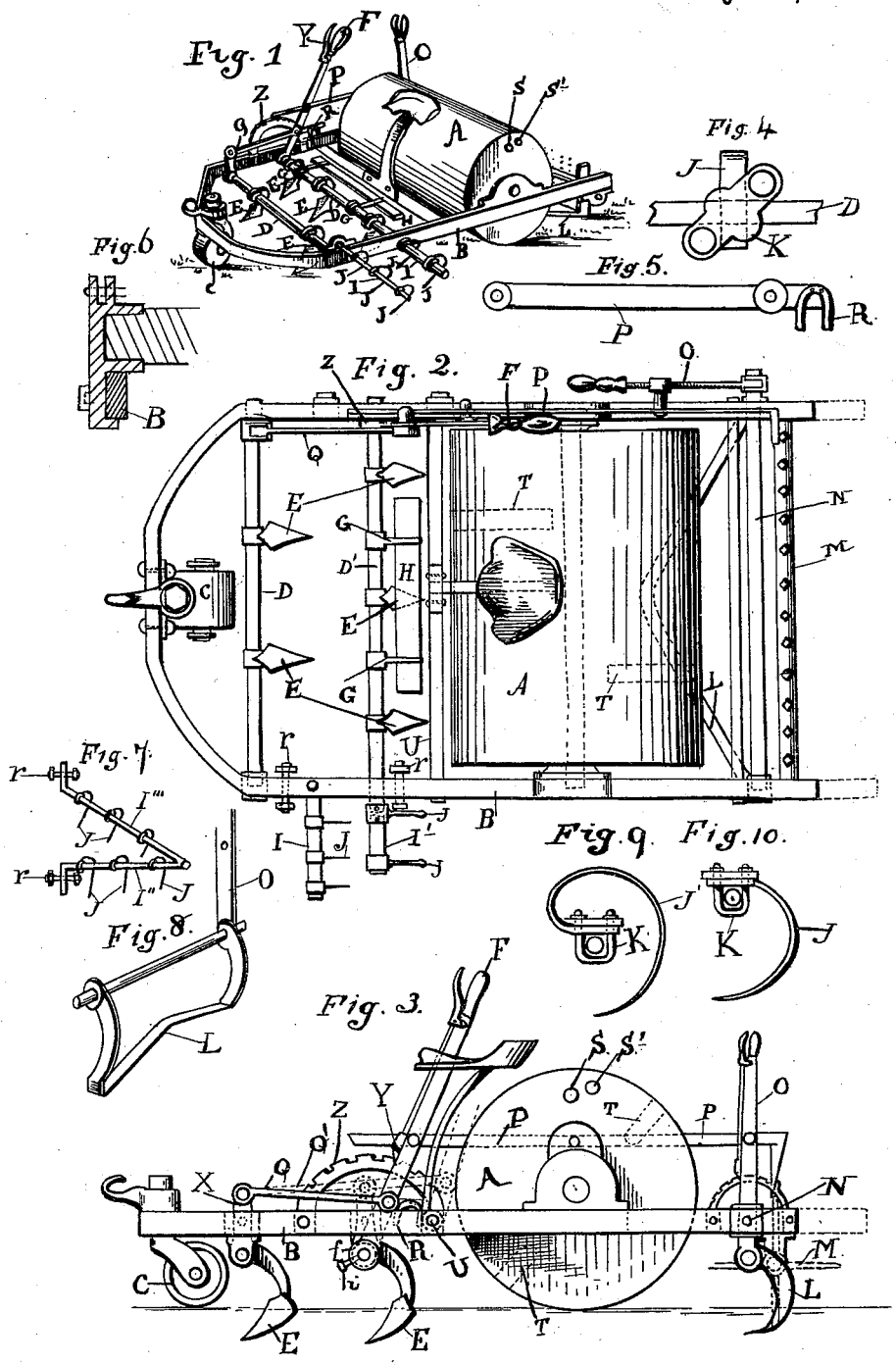
WITNESSES: INVENTOR:
Malcolm Macleod
by Hazard & Townsend
his attys (No Model.) 2 Sheets—Sheet 2.

M. MACLEOD.
AGRICULTURAL IMPLEMENT.

No. 479,094. Patented July 19, 1892.

WITNESSES: INVENTOR:

UNITED STATES PATENT OFFICE.

MALCOLM MACLEOD, OF LOS ANGELES, CALIFORNIA.

AGRICULTURAL IMPLEMENT.

SPECIFICATION forming part of Letters Patent No. 479,094, dated July 19, 1892.

Application filed December 12, 1890. Serial No. 374,527. (No model.)

*To all whom it may concern:*

Be it known that I, MALCOLM MACLEOD, a citizen of Great Britain, residing at Los Angeles, in the county of Los Angeles and State of California, have invented a new and useful Improvement in Agricultural Implements, of which the following is a specification.

The object of my invention is to produce a cheap machine, simple in its construction and operation, adapted to thoroughly cultivate and pulverize the soil, and specially adapted for use in orchards where the limbs are low hanging.

A further object is to provide means whereby the weight of the roller which forms a part of the machine can be easily increased or diminished to adapt the roller to the character of the soil.

The accompanying drawings illustrate my invention.

Figure 11:
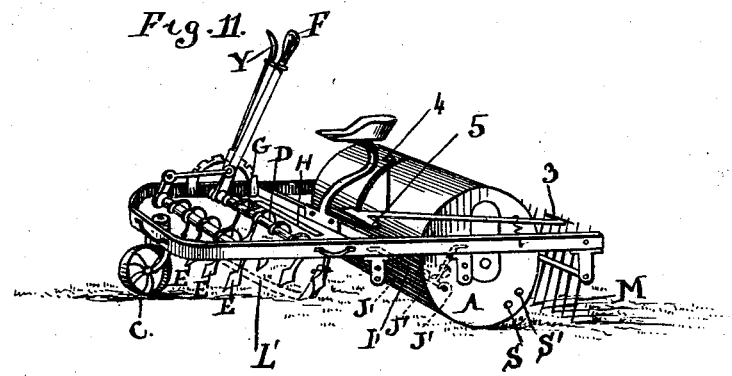
Figure 12:
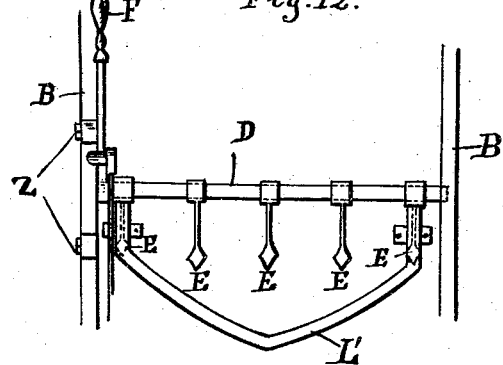
Figure 13:
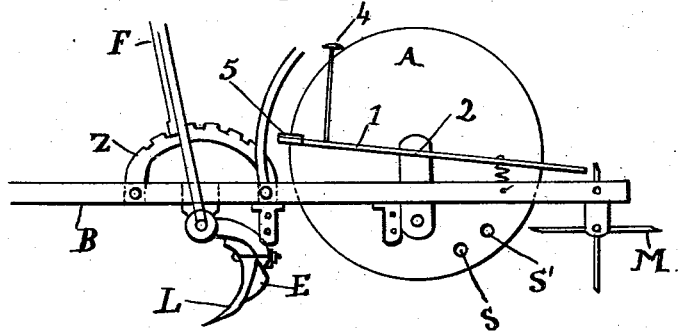

Figure 1 is a perspective view of my improved implement. Fig. 2 is a plan view of the same. Fig. 3 is a plain side elevation. Fig. 4 is a top view showing one of the cutters in place to be secured to the cutter-shaft by a clip, the plate of which is also shown. Fig. 5 is a detail of the connecting-rod Q. Fig. 6 is a vertical mid-section of the blind-bracket, which journals the axle of the roller, and also with slight modifications the ends of the cutter-shafts, which are not extended through the frame. Fig. 7 is the extension attachment, being a preferred form of the extension side arms. Fig. 8 is a detached view of the weed-cutting attachment with part of its actuating-lever. Figs. 9 and 10 are detail views of spring-cutters for the side extensions. Fig. 11 is a perspective view of a modification of the rake arrangement, and also showing the weed-cutter attached to the rear cutter. Fig. 12 is a fragmentary top view showing the weed-cutter attached to the rear cutter-shaft. Fig. 13 is a plain side elevation of a portion of the roller, showing the weed-cutter attached to the rear cutter-shaft and also showing the modified rake arrangement.

My invention pertains to that class of agricultural implements known as "cultivators and pulverizers," and relates particularly to the construction, arrangement, and combination of parts, whereby I secure greater efficiency and economy and convenience of operation.

My improved machine consists of a roller-supported frame B, having for its rear support a hollow pulverizing-roller A, journaled in the frame B, and for its front central supporting-roller an ordinary caster-wheel C, two horizontal cutter-shafts D D', journaled in the frame in front of the pulverizing-roller, the cutters E, rigidly fixed thereon, and the hand-lever F, arranged at the side of the machine and connected with the cutter-shafts to partially rotate them, and the foot-levers G, which are attached to the rear cutter-shaft and are provided with a foot rest or plate H, arranged at the middle of the machine, so that the operator can use his hand and his feet at the same time when forcing the cutters into the ground.

The hand-lever F is provided with a pawl Y, which engages the arc rack z to hold the lever fixed in the desired position.

The machine is provided on its side with the laterally-projecting cutter shafts or arms I, having spring-cutters J for cultivating beneath the low limbs of orchard-trees close to the trees. These spring-cutters are of greater or less flexibility, according to the character of the soil and of the trees to be cultivated.

Fig. 9 shows a cutter of greater flexibility than that shown in Fig. 10. This form of cutter is specially adapted for cultivating close to trees having roots near the surface of the ground. The shanks of the knives or cutter-teeth are preferably secured to the cutter-shafts by clips K to facilitate their adjustment and removal.

The machine is designed to be used interchangeably with a weed-cutter L or a weed-rake M M, secured to the frame behind the roller, and the frame may be extended farther to the rear, as indicated by dotted lines in Figs. 2 and 3, thus to allow both the weed-cutter and the weed-rake to be attached to the frame and operated at the same time.

The weed-cutter may be secured to the machine in various ways. I prefer the form shown in Figs. 11, 12, and 13, in which the weed-cutter is attached directly to the rear cutter-shaft D', so that the operation of the lever F will force the weed-cutter into or withdraw it from the ground, as may be desired.

In Figs. 1, 2, and 3 the weed-cutter is shown fixed upon an oscillating shaft N, journaled to the frame behind the roller and provided with an operating-lever O, by which the shaft is turned to force the cutter into or withdraw it from the ground. The weed-cutter consists of a single V-shaped knife, and extends across beneath the frame from side to side thereof. The lever O may be connected with the front cutter-lever F by means of the connecting-rod P, which will enable the operator to control the weed-cutter without leaving his seat.

The connecting-rod Q, which connects the crank-arm $x$ of the front cutter-shaft with the lever F, is arranged to be detached from the lever and is provided with the angular catch R, as shown in Fig. 5, which can be dropped down to clasp the angular portion of the cutter-shaft D' to hold such rod Q stationary in position to hold all the front cutters out of the ground. The recess in catch R is angular and the rear cutter-shaft is correspondingly-angular in cross-section at the point at which the catch engages it, so that when the catch clasps the rear shaft such shaft is held from turning. The lever F is secured releasably to the shaft D' by a set-screw $f'$ or other suitable means, so that when it is desired to use it independent of the cultivator-cutters, it can be released therefrom. When this is done, the cutters are raised out of the ground and secured in this raised position by lowering the connecting-rod to cause the catch to clasp the angular portion of the shaft. The roller is a hollow iron shell, made water-tight and provided in one end with the two capped filling-holes S S', through which water may be introduced into the roller to increase its weight. I provide the roller with a series of rotating arms T T, (shown in dotted lines in Figs. 2 and 3,) which are secured to the shell of the roller, and by breaking the body of water prevent it from moving in a mass and thus lashing. This secures a steadier motion than can be obtained with the liquid-containing roller unsupplied with such device or its equivalent.

It is apparent that the cultivator portion of this machine can be used with or without the weed-cutter and rake and can be used without the pulverizing-roller, also, if the place of such roller is supplied by two wheels or other device.

I also contemplate a modification of the arrangement of the hand-lever F. This is shown in dotted lines in Fig. 3. The lever F', instead of being detachably secured to the rear cutter shaft D', as indicated by the set-screw $i$, is journaled upon the stay-shaft or brace U and the connecting-rod Q' (shown in dotted lines,) is connected with the rear cutter-shaft by an arm V, fixed to such shaft. The connecting-rod is detachable from the lever F' and from the arm V, and when detached therefrom the catch R is dropped upon the shaft D', as above described, to hold the cutters E out of the ground and leave the lever F perfectly free to control the weed-cutter or the rake, as the case may be.

I deem the extension-arms shown in Fig. 7 preferable to those shown in Figs. 1 and 2. They are united at their outer ends so as to be self-bracing and are designed to be secured to the frame B, by the bolts $r$. By this form of construction the arms can be extended to any length likely to be required for cultivating beneath the limbs of orchard-trees.

The rake attachment shown in Figs. 11 to 13 is designed for operation either by the foot or hand of the operator.

1 is a lever pivoted by pivot 2 to the frame of the roller and arranged to project back to bring the cross-bar 3, which is fixed upon its rear end into the path of the revolving rake-teeth M. The front end of the lever projects forward into reach of the hand and foot of the operator and is provided with the handle 4 and foot-rest 5, by means of which the operator depresses the front end of the lever to withdraw the cross-bar 3 out of the path of the rake teeth to allow the teeth to revolve to discharge the weeds.

Now, having described my invention, what I claim as new, and desire to secure by Letters Patent, is—

1. In an agricultural machine organized substantially as set forth, the combination of the frame, the front oscillating cutter-shaft D, having the crank arm $x$, the rear oscillating cutter-shaft angular in part of its cross-section, the hand-lever detachably connected with such rear shaft, and the connecting-rod Q, provided with the angular catch R to clasp the angular portion of the shaft.

2. An agricultural machine comprising the roller-supported frame, and the cutter-shaft provided with the cultivator cutters and having the weed cutter-knife fixed thereon and extending from side to side thereof in front of the cultivator cutters.

MALCOLM MACLEOD.

Witnesses:
JAMES R. TOWNSEND,
ALFRED I. TOWNSEND.